(12) United States Patent
Whalen et al.

(10) Patent No.: US 6,837,375 B2
(45) Date of Patent: Jan. 4, 2005

(54) DISK CARRIER WITH SPINDLE

(75) Inventors: Thomas J. Whalen, Minnetrista, MN (US); Michael S. Adams, New Prague, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/208,652

(22) Filed: Jul. 30, 2002

(65) Prior Publication Data

US 2003/0029771 A1 Feb. 13, 2003

Related U.S. Application Data

(60) Provisional application No. 60/309,195, filed on Jul. 31, 2001.

(51) Int. Cl.[7] .............................................. B65D 85/48

(52) U.S. Cl. ..................... 206/454; 206/710

(58) Field of Search ............................ 206/303, 308.1, 206/308.3, 389, 391, 454, 394, 407, 414, 509, 493, 511–701, 710, 711, 712; 211/41.12, 41.18

(56) References Cited

U.S. PATENT DOCUMENTS

| 4,253,571 A | 3/1981 | Keohan |
| 4,557,382 A | 12/1985 | Johnson |
| 4,577,756 A | 3/1986 | Hennessy et al. |
| 4,754,447 A | 6/1988 | VanSant |
| 4,779,724 A | 10/1988 | Benz et al. |
| 4,826,005 A | 5/1989 | Tajima et al. |
| 5,253,755 A | 10/1993 | Maenke |
| 6,116,416 A | 9/2000 | Hansen et al. |
| 6,138,824 A | 10/2000 | Hyakusoku et al. |
| 6,230,891 B1 | 5/2001 | Usui et al. |
| 6,382,413 B1 | 5/2002 | Nakamura et al. |

*Primary Examiner*—Shian T. Luong
(74) *Attorney, Agent, or Firm*—Patterson, Thuente, Skaar & Christensen, P.A.

(57) ABSTRACT

The disk carrier with spindle comprises an outer shell including an upper portion and a lower portion that connect together to form a chamber to enclose disks and constrain a spindle in place in the chamber. The spindle further comprises elongated portions or partial cylinder sections joined by a hinge so that the spindle can be moved into a contracted position to freely pass through a central aperture of a disk or into an expanded position to contact the inner perimeter of the disk and secure the disk.

13 Claims, 4 Drawing Sheets

DISK CARRIER WITH SPINDLE

RELATED APPLICATIONS

This application claims the benefit of U.S. Provisional Application No. 60/309,195, filed on Jul. 31, 2001, which is hereby incorporated herein by reference.

FIELD OF THE INVENTION

The present invention relates to a container configured to hold a particular article or set of articles or material. In particular, the present invention relates to a disk carrier or container having a spindle and used to house and protect computer components such as magnetic disks during a manufacturing or transportation process.

BACKGROUND OF THE INVENTION

Containers for magnetic disks protect the disks from damage during storage and shipment. One kind of conventional container comprises a cassette portion, a top cover, and a bottom cover, each formed separately by injection molding. The cassette portion is integrally formed of a rigid plastic, such as polycarbonate. It has elongate side walls that extend vertically on the upper portions and curve inwardly on the bottom portions to an open bottom, vertical end walls with U-shaped contoured tops, and an open top and open bottom. The top cover may be formed of polycarbonate, or many similar injection grade polymers. It is shaped to follow the contours of the cassette portion and to continuously align with the side walls and end walls, and typically snaps onto a catch at or rests on the lower end of the U-shaped contours in the end walls. The bottom cover may be formed of a similar polymer as the top cover and is generally rectangular and tray shaped. It engages and is frictionally retained on the open bottom of the cassette. Examples of this kind of container are found in U.S. Pat. No. 4,557,382 and U.S. Pat. No. 5,253,755.

These kinds of carriers secure disks by engaging the disks' peripheral edges. Consequently, damage to disks can occur when a container housing the disks is subject to a jolt or shock. Moreover, contact between the cassette and the disks may encourage plastic particles or other particulation to migrate to the disks. Thus, as an alternative, a second kind of container may be used to house and protect the disks, one that implements a spindle that passes through the central aperture of the disks.

A rather simple example of a disk carrier having a spindle is disclosed in Tajima, U.S. Pat. No. 4,826,005, Packaging of Information Recording Media, wherein an elongate member such as a pipe is used. Other disk carriers use fixed structured spindles incorporating spacers to separate the disks from one another, which spacers are either attachable to and detachable from the spindle or permanently attached to the spindle. Examples of these kinds of spindles are disclosed in Keohan, U.S. Pat. No. 4,253,571, Disc Container; Hennessy et al., U.S. Pat. No. 4,577,756, Protective Canister for Computer Discs; and VanSant, U.S. Pat. No. 4,754,447, Multidisk Spindle. Generally, these spacers are concentric rings intended to fit over a spindle. In addition to separating the disks, these spacers can fit snuggly against the edge of a central aperture of a disk so that the spindle can be sized to freely pass through the aperture.

To incorporate spacing means onto a spindle while allowing the spindle to freely pass through an aperture or snuggly fit against the edge of the central aperture when desired, complex mechanical means have been devised and incorporated into spindles to both expand and contract them diametrically. Examples of these spindles are Benz, U.S. Pat. No. 4,779,724, Support Structure for Annular Magnetic Recording Disks; Hansen et al., U.S. Pat. No. 6,116,416, Magnetic Hard Disk Transportation System and Method; Hyakusoku et al., U.S. Pat. No. 6,138,824, Hard Disk Carrier; and Nakamura et al., U.S. Pat. No. 6,382,413 B1, Disk Holder and Disk Storage Device. In brief, Benz et al. disclose two elongate, axially aligned cam actuating members used to effect displacement of two elongate, diametrically opposed arcuate support members away from each other. Hansen et al. discloses first a cam bar having an oval transverse profile that, when rotated along its longitudinal axis, either expands or contracts two diametrically opposed capture bridges, and second a four piece spindle having an internal lift bar that causes the outer pieces to expand outwardly when a wedge is forced under the lift bar. Hyakusoku et al. discloses spreading diametrically opposed half cylinders using a release means including a collet and coil springs. Nakamura et al. discloses using a cam actuator to spread two diametrically opposed and interconnected bars having U-shaped transverse profiles. In each of these patents, the means for expanding and contracting the spindle is a mechanical means such as a threaded or rotating device, sliding cam actuator, or insertable wedge or collet. These means are both complicated to make and are more susceptible to deterioration in a caustic environment. Moreover, abrasion by rubbing working parts is a serious source of particulation that can attach to the disks.

Therefore, it would be advantageous to have a disk carrier having a spindle that expands and contracts and is easy to make. It would also be advantageous if the spindle were simple enough to make of material that is relatively impervious to a caustic environment. It would further be advantageous if the spindle were to have a minimal number of working parts to minimize the amount of particulation created by the container.

SUMMARY OF THE INVENTION

The disk carrier with spindle comprises an outer shell including an upper portion and a lower portion that connect together to form a chamber to enclose disks and constrain a spindle in place in the chamber. The spindle further comprises elongated portions or partial cylinder sections joined by a hinge so that the spindle can be moved into a contracted position to freely pass through a central aperture of a disk or into an expanded position to contact the inner perimeter of the disk and secure the disk.

The present invention provides a disk carrier or container with a spindle to house and protect disks having an inner perimeter defining a central aperture. The disk carrier can be constructed so that disks housed inside the disk carrier remain free and clear of the walls of the disk carrier, even in the event that the disk carrier is jolted or shocked, thus reducing the amount of damage to the outer rims of the disks and the amount of particulation transferring from the outer shell of the container, or otherwise being attracted, to the disks. The spindle can be contracted to pass through the central aperture of one or a plurality of disks and expanded to secure the disks in place. Because the spindle uses a hinge instead of a more complex mechanical means, it is easy to manufacture at a significantly lower cost and can be made of a material, such as a molded plastic, that is resistant to deterioration in a caustic environment. Moreover, because the hinge is the only working part on the spindle, there is little or no abrasion between working parts to create particulation that might migrate onto the disks.

Preferred embodiments of the disk carrier comprise an outer shell and a spindle. The outer shell further comprises an upper portion having a bottom rim defining an upper portion opening and a lower portion having a top rim defining a lower portion opening, the upper portion and the lower portion configured and arranged to connect together to form a chamber to enclose the disks and support the spindle in the chamber. Disks secured on the spindle may also rest against the outer shell of the disk carrier, although preferably the carrier is constructed and arranged so that the disks remain free and clear of the outer shell, even in the event of a jolt or shock to the carrier.

The disk carrier spindle further comprises at least two elongate portions, each having a longitudinal dimension and an outer surface. It may also have at least one edge along the longitudinal dimension. At least one hinge is used join the at least two elongate portions. The spindle has a contracted position and an expanded position so the spindle may freely pass though the central aperture of a disk when the spindle is in the contracted position, and so at least part of the outer surfaces of the at least two elongate portions contact the inner perimeter of the disk when the spindle is in the expanded position. The spindle may be used without the outer shell.

Preferably, the spindle has two elongate portions joined by a living hinge and the expanded position causes the transverse profile of the elongate portions to form an open circle, so the outer surfaces of the elongate portions apply pressure evenly to the inner perimeter where it contacts the spindle, thereby maximizing contact between the outer surfaces and the inner perimeter and minimizing the pressure needed to secure the disk and the likelihood of damaging the disk. Also preferably, the transverse profile of each elongate portion is convex and the convex transverse profiles open towards each other when the elongate portions are joined by the hinge. Multiple pairs of elongate portions may be joined together by hinges if multiple pairs of elongate portions are present.

In operation, a disk carrier including a lower portion having a lower portion inside, an upper portion having an upper portion inside, and a spindle having a hinge and a plurality of receiving regions is used by contracting the spindle so the spindle may freely pass through the central aperture of at least one disk. Each disk is serially aligned with a receiving region on the spindle and the spindle is expanded to secure each disk on the spindle. The spindle is positioned in either the lower portion or the upper portion of the outer shell and the portions are connected together to form a chamber to enclose the at least one disk and constrain the spindle inside the upper and lower portions. Those skilled in the art are aware that these steps may be performed as effectively in other orders as well.

DESCRIPTION OF THE PREFERRED EMBODIMENT

Figure 4:
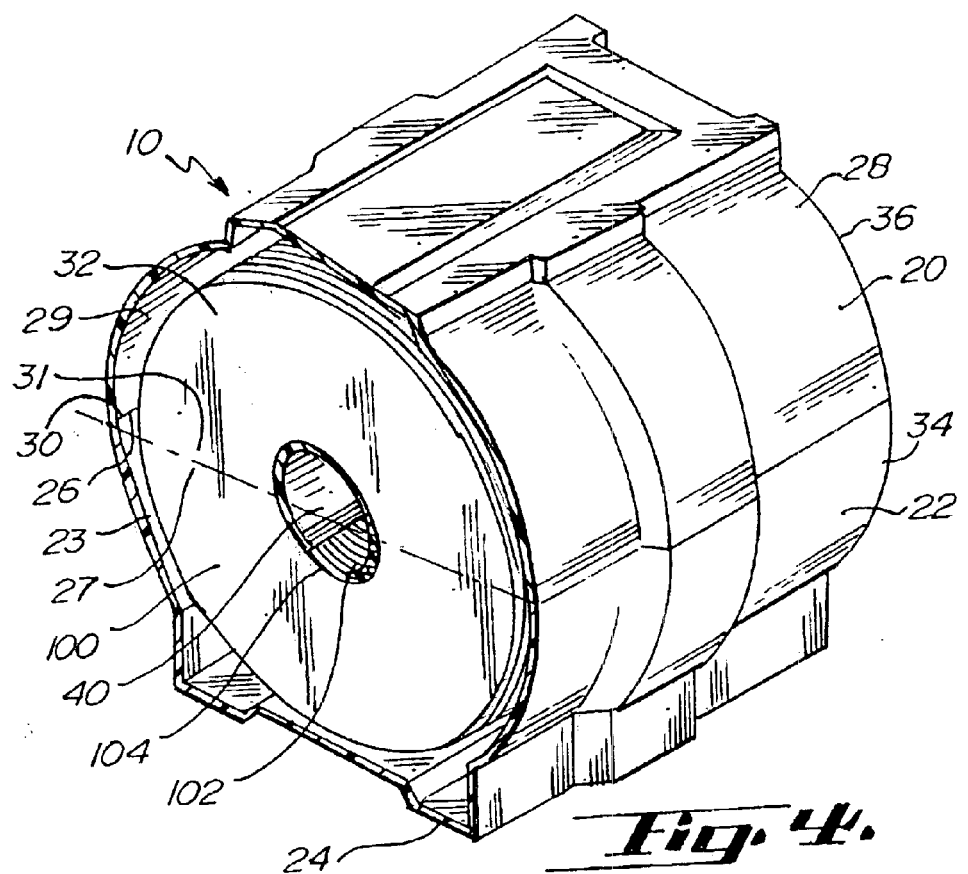
FIG. 4 is cut-away view of the disk carrier of FIG. 1, revealing the spindle and a disk.
Figure 3:
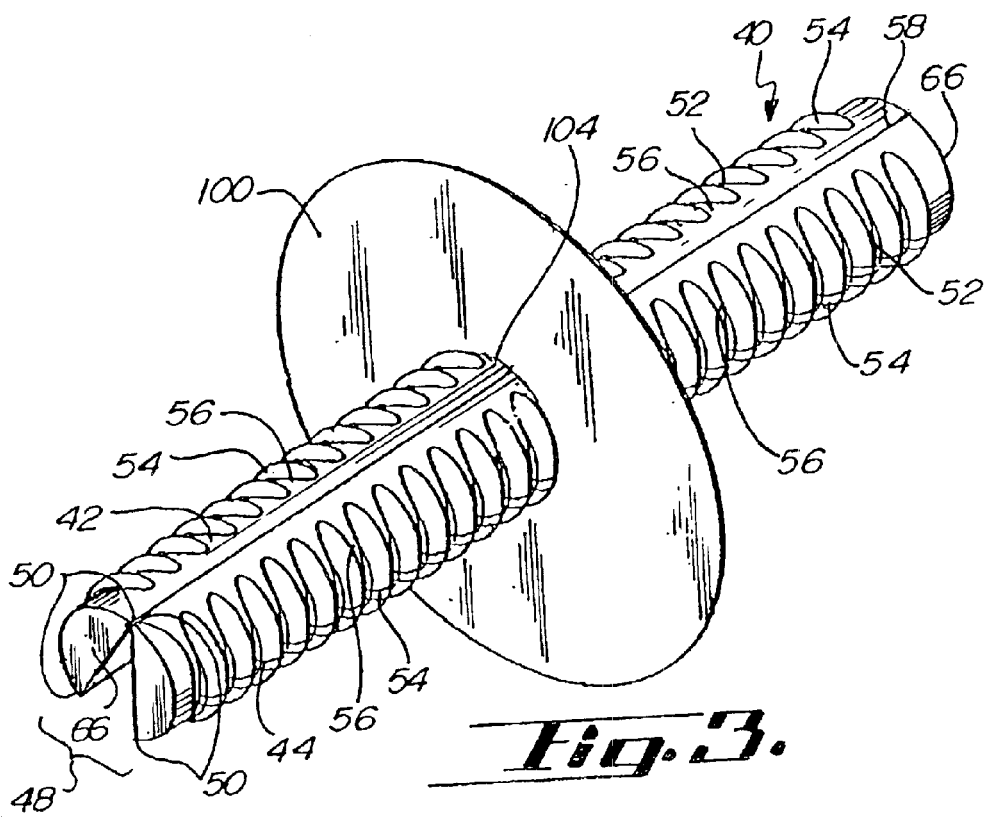
FIG. 3 is a perspective view of the spindle of the disk carrier of FIG. 1.
Figure 5:
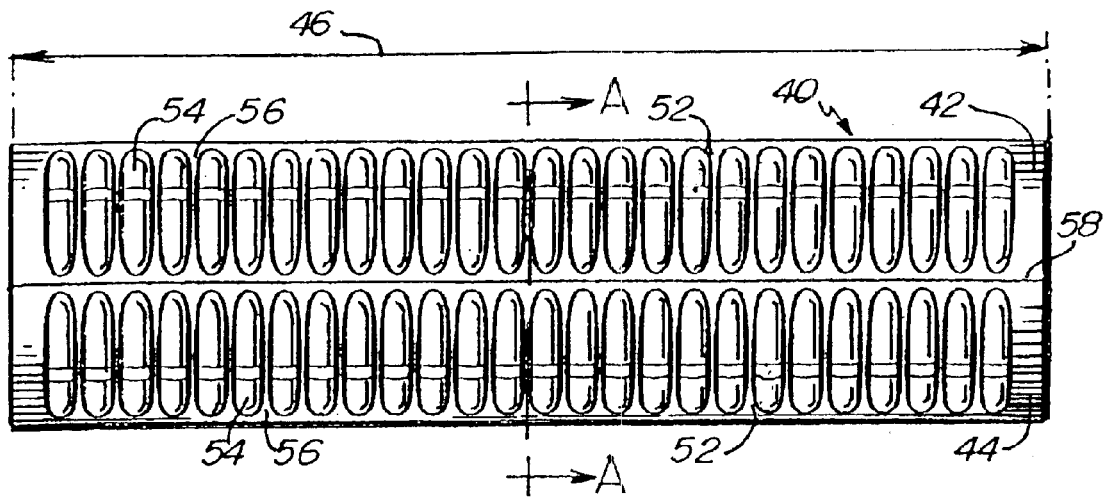
FIG. 5 is a top plan view of a spindle.
Figure 7:
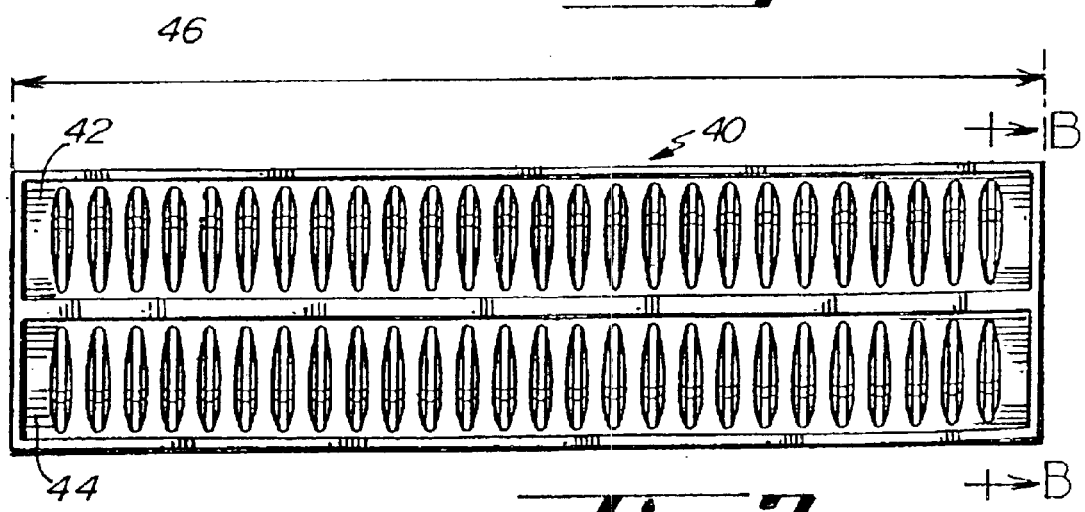
FIG. 7 is a bottom view of the spindle of FIGS. 5 and 6.
Figure 9:
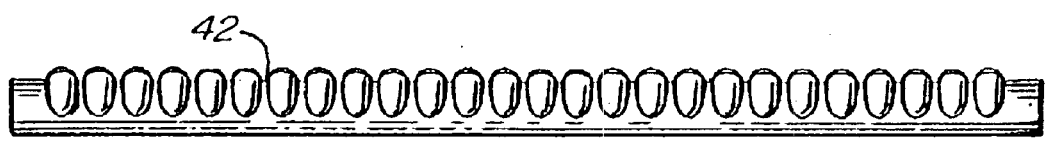
FIG. 9 is a side view of a partial cylinder section of FIGS. 3–8.
Figure 6:
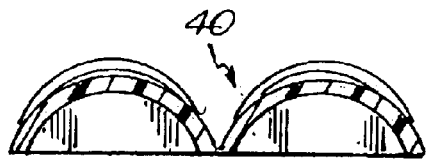
FIG. 6 is a cross-sectional view of FIG. 5 taken at line A—A.
Figure 10:
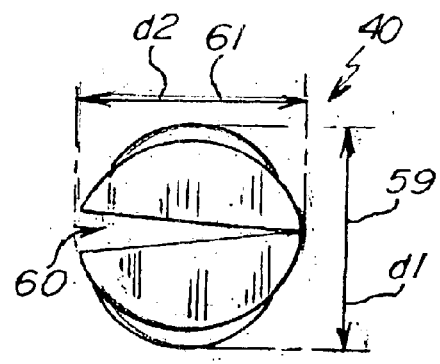
FIG. 10 is an end view of the spindle of FIGS. 3–9 in contracted position.
Figure 8:
FIG. 8 is a cross-sectional view of the spindle of FIG. 7 taken at line B—B.
Figure 11:
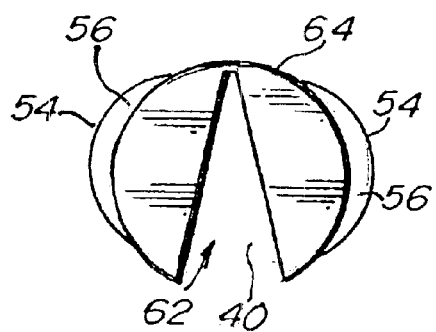
FIG. 11 is an end view of the spindle of FIGS. 3–9 in expanded position.

The preferred embodiment relates to a disk carrier having a spindle and a method for using the disk carrier, in accordance with the present invention. The disk carrier is used to house and protect disks 100 having an inner perimeter 104 defining a central aperture 102, as shown in FIGS. 3 and 4.

Figure 1:
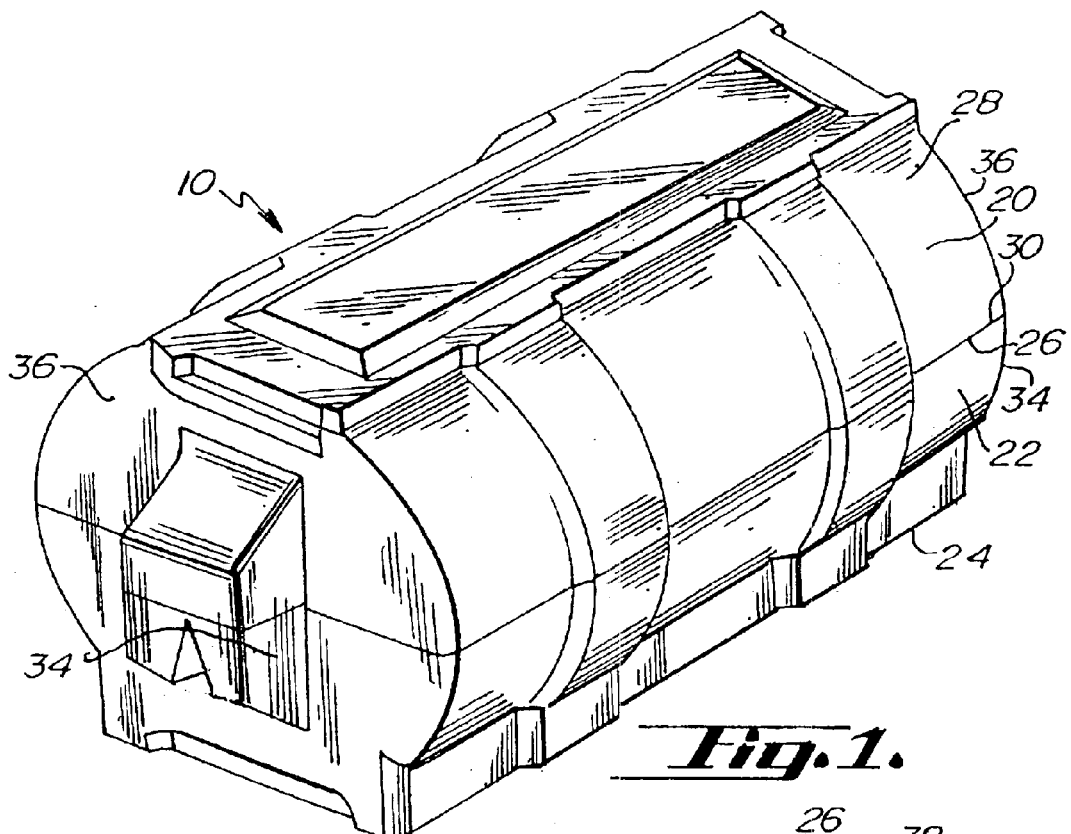
FIG. 1 is a perspective view of a disk carrier according to the preferred embodiment of the present invention.
Figure 2:
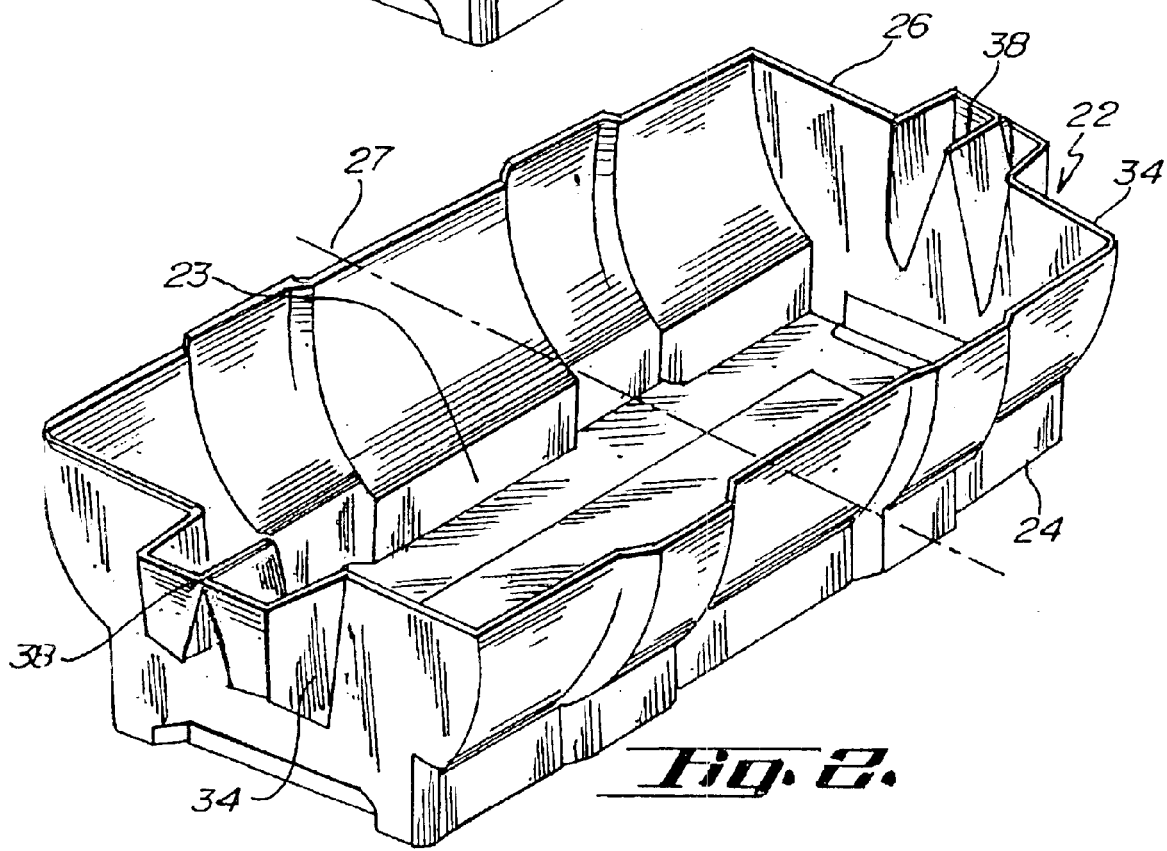
FIG. 2 is a perspective view of the bottom portion of the disk carrier of FIG. 1.

The preferred embodiment of the disk carrier 10 comprises an outer shell and a mandrel or spindle. As shown in FIGS. 1, 2, and 4, the outer shell 20 includes a lower portion 22 and an upper portion 28. The lower portion 22 has a lower portion inside 23, a top rim 26 defining a lower portion opening 27, opposing lower portion ends 34, and a bottom surface 24. The upper portion 28 has an upper portion inside 29, a bottom rim 30 defining an upper portion opening 31, and opposing upper portion ends 36. When the lower portion 22 and the upper portion 28 are properly connected, together they form a chamber 32 for housing or enclosing the disks in a serially and axially aligned manner. Although the outer shell 20 can be any shape, preferably it is generally cylindrical with a flat bottom surface 24 for setting on flat surfaces. Both portions have relief structure to strengthen the portions, which are injection molded from polymers such as polycarbonate, polypropylene, polyester or other suitable polymers known to those skilled in the art. Those skilled in the art are also aware that there are many ways in which to connect the lower portion 22 and the upper portion 28, such as frictionally fitting the bottom rim 30 inside the top rim 26 or using latches. Either the lower portion ends 34 or the upper portion ends 36 or both have a structure for trapping or clamping or constraining a spindle in the chamber 32. Preferably, this structure is a V-shaped wedge 38 positioned on each lower portion end 34 near the top rim 26 and pointing toward the lower portion opening 27 or upper portion 28. Either gravity and/or engagement with the spindle 40 can be used to hold the spindle 40 on the wedges 38 or the upper portion 28 may have structure such as a tab to keep the spindle 40 on the wedges 38 once the portions are connected. Alternatively, the wedges 38 may be similarly positioned on the upper portion 28. Another alternative is using tabs on the lower portion 22 and the upper portion 28 that in combination clamp or trap the spindle 40 in place. Another alternative is providing recesses in either or both portions.

As shown in FIGS. 3–10, the spindle 40 is cylindrical, being further comprised of two elongate portions or partial cylinder sections 42 and 44. Although disks on the spindle 40 may also rest against the outer shell, preferably disks housed therein on the spindle 40 remain free and clear of the outer shell even when the disk carrier is jolted or otherwise shocked or stressed. These sections are also injection molded from polymers such as polycarbonate, polypropylene, polyester or other suitable polymers known to those skilled in the art. The sections of the preferred embodiment are hollow, although they may be solid or have a reinforcing structure. Each partial cylinder section 42 and 44 has a longitudinal dimension 46, a convex transverse profile 48, at least two edges 50 along the longitudinal dimension 46, and an outer surface 52. Preferably, the spindle 40 also has a plurality of ribs 54 to space or separate disks on the spindle 40 and receiving regions 56 intermittently positioned between successive ribs 54 where the disks are secured on the spindle 40.

A living hinge 58 connects the partial cylinder sections 42 and 44 along an edge 50 of each section so that the convex transverse profiles 48 of the sections open towards each other. Those skilled in the art are aware that other kinds of hinges can be used, such as a conventional hinge, possibly having a plastic pin, or a piano hinge. The distance d1 59 and d2 61 across each section are such that when the spindle 40 is closed to a contracted position 60, the spindle freely passes through the central aperture of a disk; and when the spindle 40 is opened to an expanded position 62, the outer surfaces 52 of the spindle 40 fit snuggly against the inner perimeter 104 of the disk to frictionally secure the disk on the spindle 40. Preferably, when the spindle 40 is in the expanded position 62, the transverse profile 48 of the spindle 40 forms an open circle 64, resembling a pie with a piece missing, providing for continuous and maximum contact between the outer surfaces 52 and the inner perimeter 104, thereby reducing the pressure needed to secure the disk and the likelihood of damaging the disk. To position the spindle 40 in the outer shell 20 of the preferred embodiment, the spindle 40 is placed over and pushed downwardly onto the wedges 38 of the lower portion 22 to engage the wedges 38 at the spindle's ends 66, which forces the spindle 40 into the expanded position to secure any disks that were put on the spindle 40. The spindle 40 may be electrically conductive to carry static charge away from the disks. The lower portion 22, at least between the spindle 40 and its bottom surface 24, may also be electrically conductive to carry static charge from the spindle 40 through the bottom surface 24 to a grounded surface. Alternatively, electrically conductive strips may be used on the spindle 40 to carry charge away from the disks and/or the lower portion 22 to carry the charge from the spindle 40 to the bottom surface 24 and the grounded surface. The hinge and the elongated portions may be integrally molded components.

Figure 12:
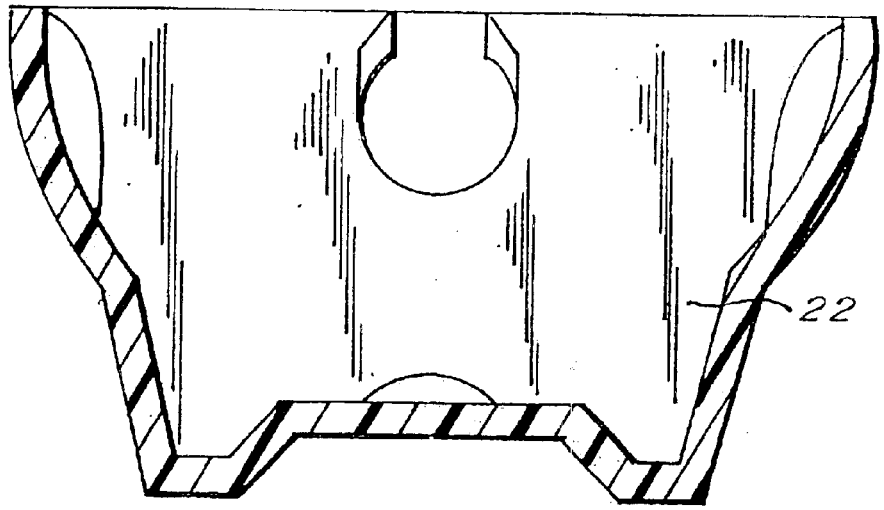
FIG. 12 is a perspective view of a docking system for removing the spindle from the disks.

The spindle may be removed from the disks using one of several ways. The spindle and disks can be lifted from the outer shell and moved to a support that allows for removing the spindle from the disks. Alternatively, as shown in FIG. 12, the lower portion of the outer shell may have ribs for docking the disks, so that the spindle can be lifted from the wedges and lowered into the lower portion of the outer shell, contracted, and removed from the disks through a keyhole in the side of the outer shell.

In operation, a disk carrier including a spindle having a living hinge and a plurality of ribs and receiving regions is used by contracting the spindle so the spindle may freely pass through the central aperture of at least one disk. Each disk is serially aligned with a receiving region on the spindle and the spindle is expanded to secure each disk on the spindle. The spindle is positioned onto the wedges of the lower portion of the outer shell and the lower and upper portions are connected together to form a chamber to enclose the at least one disk and constrain the spindle in the chamber.

Although the preferred embodiment of the disk carrier with spindle has been described herein, numerous changes and variations can be made and the scope of the invention is intended to be defined by the claims herein.

That which is claimed:

1. A disk carrier for housing a plurality of disks, each disk having an inner perimeter defining a central aperture, the disk carrier comprising an outer shell and a spindle, the outer shell comprising an upper portion having a bottom rim defining an upper portion opening and a lower portion having a top rim defining a lower portion opening, the upper portion and lower portion configured and arranged to connect together at their rims to form a chamber to enclose the disks and support the spindle in the chamber; and the spindle comprised of
at least two elongate portions, each having a longitudinal dimension, a convex transverse profile, at least two edges along the longitudinal dimension, and an outer surface;
a living hinge joining an edge from each of the at least two elongate portions so the transverse profiles of the at least two elongate portions open towards each other, wherein the spindle has a contracted position and an expanded position so the spindle may freely pass through the central aperture of a disk when the spindle is in the contracted position and so the transverse profiles of the at least two elongate portions form an open circle and the outer surface of each elongate portion fits continuously and snuggly against the inner perimeter of the disk when the hinge is in the expanded position.

2. The disk carrier of claim 1, wherein disks housed therein remain free and clear of the outer shell even when the carrier is jolted or shocked.

3. The disk carrier of claim 1, wherein the upper portion, lower portion, and spindle are each made of a molded polymer.

4. The disk carrier of claim 3, wherein the molded polymer is selected from the group of polymers consisting of polycarbonate, polypropylene, polyester, and any combination thereof.

5. The spindle of claim 1, wherein the hinge and the elongated portions are integrally molded components.

6. The disk carrier of claim 1, wherein the spindle is electrically conductive.

7. The disk carrier of claim 1, wherein the lower portion has a bottom surface and is electrically conductive between the spindle and the bottom surface.

8. The disk carrier of claim 1, wherein the lower portion has a bottom surface and an electrically conductive strip connects the spindle and the bottom surface.

9. The disk carrier of claim 1, wherein the upper portion and the lower portion each have opposing ends and the opposing ends on a portion each have a wedge pointing toward the other portion, wherein the spindle engages the wedges to hold the spindle in the expanded position.

10. The disk carrier of claim 1, wherein the upper portion and the lower portion each have a tab structure that in combination clamps the spindle in place.

11. The disk carrier of claim 1, wherein the spindle has a plurality of ribs to maintain separation between the disks.

12. The disk carrier of claim 1, wherein to remove the spindle from the disks, the bottom portion has a plurality of ribs to dock the disks and the outer shell has a keyhole through which the spindle is removed from the disks.

13. A disk carrier for housing a plurality of disks, each disk having an inner perimeter defining a central aperture, the disk carrier comprising an outer shell and a spindle, the outer shell comprising an upper portion having a bottom rim defining an upper portion opening and a lower portion having a top rim defining a lower portion opening, the upper portion and the lower portion configured and arranged to connect together to form a chamber to enclose the disks and support the spindle in the chamber; and the spindle comprised of at least two elongate portions, each having a longitudinal dimension, at least one edge along the longitudinal dimension, and an outer surface;

a hinge joining an edge from each of the at least two elongate portions, wherein the spindle has a contracted position and an expanded position so the spindle may freely pass through the central aperture of a disk when the spindle is in the contracted position and so at least part of the outer surfaces of the at least two elongate portions contact the inner perimeter of the disk when the spindle is in the expanded position, and the spindle has a transverse profile and the transverse profile forms an open circle when the spindle is in the expanded position, and wherein the outer surfaces of the spindle continuously and snuggly fit against the inner perimeter of a disk.

* * * * *